(12) United States Patent
Waisbrod et al.

(10) Patent No.: US 6,267,343 B1
(45) Date of Patent: Jul. 31, 2001

(54) CABLE SUPPORT

(75) Inventors: Neville Waisbrod; Neil Harriot; John Wells; Jon Fifield; Robert Stewart, all of Wellington (NZ)

(73) Assignee: Formway Furniture Limited, Wellington (NZ)

( * ) Notice: Subject to any disclaimer, the term of this patent is extended or adjusted under 35 U.S.C. 154(b) by 0 days.

(21) Appl. No.: 09/296,000

(22) Filed: Apr. 21, 1999

(30) Foreign Application Priority Data

Apr. 22, 1998 (NZ) .................................................. 330252

(51) Int. Cl.$^7$ ..................................................... B42F 13/00
(52) U.S. Cl. ........................................... 248/339; 248/317
(58) Field of Search ................................. 248/339, 304, 248/303, 307, 302, 222.52, 223.41, 58; 403/350, 351, 374.1; 411/84, 349, 553, 400, 401

(56) References Cited

U.S. PATENT DOCUMENTS

| 3,235,219 | * | 2/1966 | Green | 248/239 |
|---|---|---|---|---|
| 3,298,652 | * | 1/1967 | Burdick | 410/107 |
| 3,476,344 | * | 11/1969 | Pace | 248/216.1 |

FOREIGN PATENT DOCUMENTS

| 93 17 983 U | 2/1995 | (DE) | 21/2 |
|---|---|---|---|
| 813392 | 5/1959 | (GB) | 44/89 |
| 09308056 | 11/1997 | (JP) | 3/26 |

* cited by examiner

Primary Examiner—Anita M. King
Assistant Examiner—Hooly N Sy
(74) Attorney, Agent, or Firm—Workman, Nydegger & Seeley

(57) ABSTRACT

A cable support has a cable holding portion and a mounting portion with one or more teeth. The mounting portion and the one or more teeth are shaped for insertion into a groove formed in an item of furniture. The cable support is rotatable about an axis and the one or more teeth are shaped for penetration with one or both of the side walls of the groove. A method of supporting cables from an item of furniture is also claimed.

15 Claims, 2 Drawing Sheets

FIG. 2
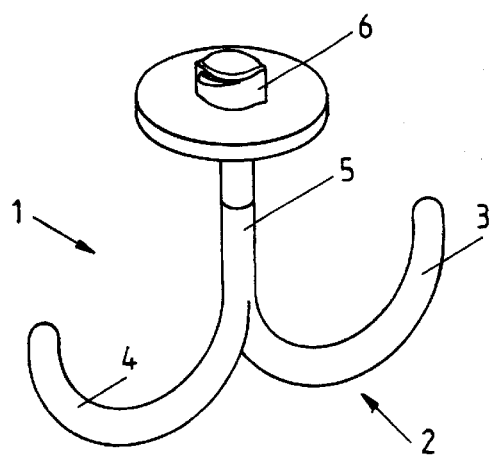
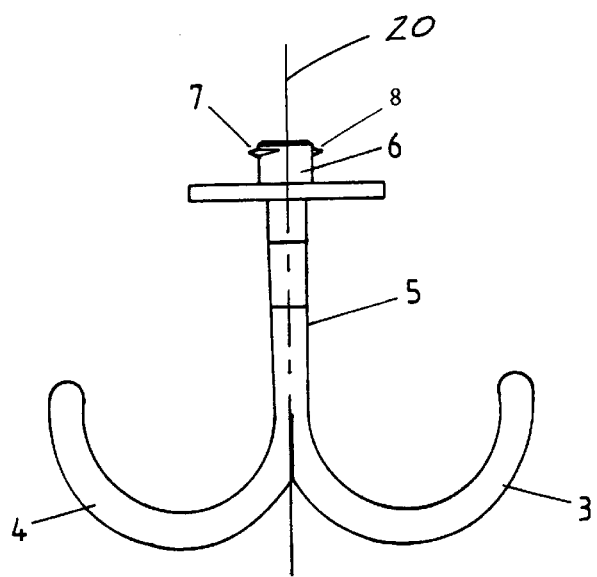
FIG. 3
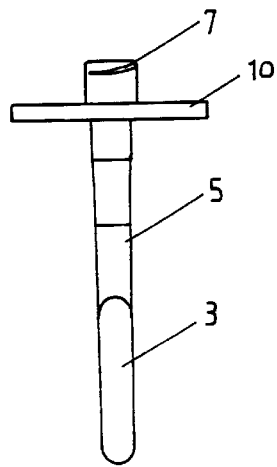
FIG. 4
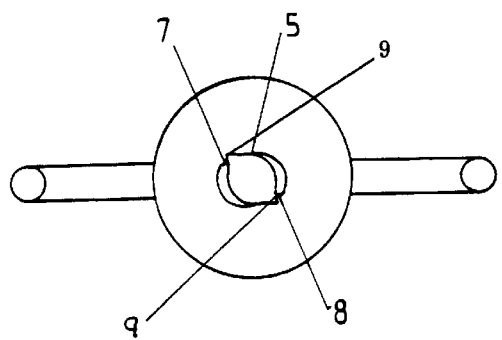
FIG. 5

CABLE SUPPORT

BACKGROUND OF THE INVENTION

This invention relates to a cable support. In particular although not exclusively, the invention relates to a cable support for suspending cables from the underside of office desks. However, the invention is not limited in its application to office desks and may be applied to other items of furniture, such as workstations, partitions or any items of domestic furniture.

DESCRIPTION OF RELATED ART

Modern information technology requires significant cabling to be accommodated in association with a workstation or desk in normal office operations. It is frequently necessary to arrange or rearrange the cabling to suit the particular user requirement at the desk, and also to accommodate upgraded equipment being used at the desk. In these circumstances it is desirable to provide a cable support which will hold the cabling in a position that is convenient for the user. It is also desirable for the cable support to be easily adjusted in position and to be moved allowing the cables to be rearranged, where necessary.

It is therefore an object of the present invention to provide a cable support which will go some way to meeting the abovementioned desiderata, or at least provide a useful choice over cable supports currently available particularly for use in association with workstations or office furniture.

BRIEF SUMMARY OF INVENTION

In accordance with a first aspect of the invention, there is provided a cable support for supporting cables from an item of furniture which has a groove with side walls provided therein, the cable support including a cable holding portion; and a mounting portion having one or more teeth, the mounting portion and the one or more teeth being shaped for insertion into the groove in a first orientation of the cable support and further, the one or more teeth being shaped for penetration with one or both of the side walls of the groove upon rotation of the cable support from the first orientation to a second orientation.

Preferably the cable support is rotatable about an axis of rotation aligned with a central axis extending through the mounting portion. The first orientation in which the cable support is disposed relative to the groove may be approximately 90° from the second orientation of the cable support in which the one or more teeth engage with the side walls of the groove. The groove may be milled into timber on the underside of the item of furniture with the timber being yieldable as the teeth are forced thereinto. The groove may be milled into timber from which the item of furniture is constructed. For example where the item of furniture is a desk or work station the groove may be milled into the underside of the desktop. As such, the desktop may be constructed of timber or other composite board which may provide a relatively soft substrate for machining the groove and for penetration of the teeth. Alternatively, the groove may be provided by way of a track affixed to the underside of the item of office furniture. For example the groove may be provided in a strip or bar of timber.

In a most preferred form of the invention there are two teeth on opposite sides of the mounting portion. The mounting portion may be cylindrical in cross-section. In a preferred form of the invention, the mounting portion may incorporate stops to limit the rotation of the cable support to the second orientation such that the one or more teeth will be located at the optimum position for engagement with the side walls of the groove. The stops may be incorporated into the overall shape of the mounting portion. For example, the stops may arise through a progressively increasing cross-sectional diameter of the mounting portion (measured across as the cable support is rotated from the first orientation to the second orientation) so that once the cable support has reached the second orientation, the frictional resistance with the side walls of the groove is such that the cable support is not able to turn further. The frictional resistance provides additional stability for the cable support within the groove.

The one or more teeth may be shaped or disposed on the external periphery of the mounting portion. Preferably the or each tooth extends in an inclined manner relative to a plane transverse to the axis of rotation. Preferably the or each tooth is inclined so that as the cable support is rotated from the first orientation to the second orientation the or each tooth causes the cable support to move inwards into the groove in a screw action. This action may be further enhanced by the provision of a collar extending in a plane transverse to the axis of rotation and spaced from the teeth in the direction away from the groove. This collar serves to engage against the wall surrounding the groove to thereby locate the cable support in the direction transverse to the plane of the groove and further as the cable support is rotated from the first orientation to the second orientation, to provide a limit against further movement of the cable support towards the groove so that the cable support will be firmly held by the material on the sides of the groove between the or each tooth and the collar.

Preferably the cable holding portion includes one or more hooks dependent from the mounting portion of the cable support. The orientation of the hook(s) will be dependent on the intended use of the cable support. For example, when the cable support is intended for use with a groove in the underside of an item of furniture then the hooks will have the opening facing towards the mounting means so as to face upwards in use. In this embodiment, the one or more hooks may be supported from a shank dependent from the mounting portion of the cable support. Preferably there are two opposed hooks provided at the same level. However, the invention also envisages more than two hooks arranged at different levels along the shank. The cable support may further include clamps to retain the cables within each hook.

In accordance with a second aspect of the present invention there is provided a method of supporting one or more cables from an item of furniture, the method including: providing a groove in the item of furniture; providing a cable support as claimed in any one of the preceding claims; inserting the mounting portion with the one or more teeth into the groove in the first orientation; rotating the cable support to the second orientation about the axis of rotation such that the one or more teeth penetrate the side walls of the groove.

Preferably the method involves installing cables into the underside of an office desk or workstation. However the method may be employed in other items of office furniture such as divider panels, reception counters or the like.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF DRAWINGS

One preferred form of the invention will now be described with reference to the accompanying drawings in which:

FIG. 2 is a perspective view of the cable support according to the present invention;

FIG. 3 is a side view of the cable support of FIG. 2;

FIG. 4 is a end view of the cable support of FIG. 2; and

FIG. 5 is a top plan view of the cable support of FIG. 2.

DETAILED DESCRIPTION OF A PREFERRED EMBODIMENT

Figure 1:
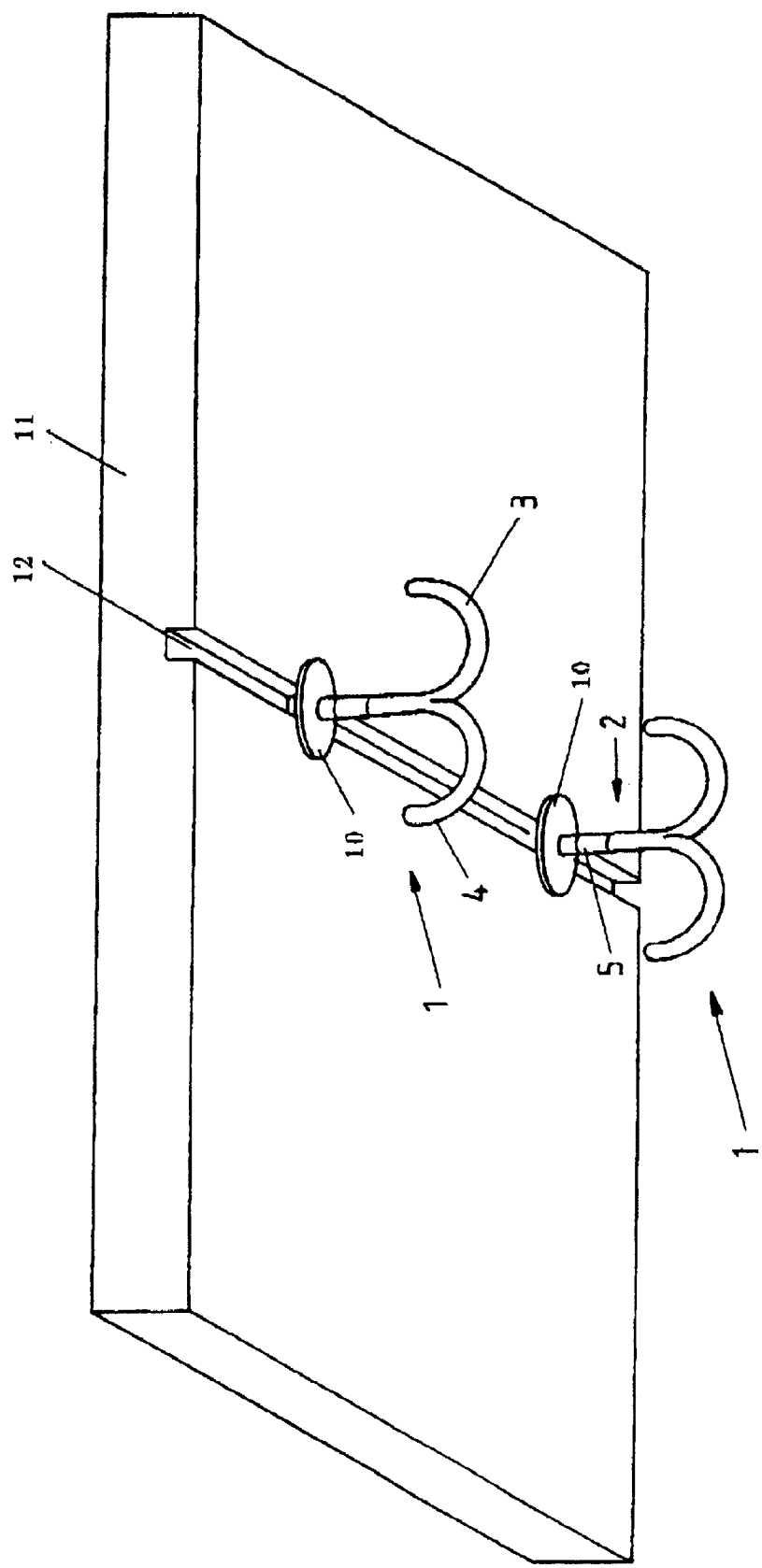
FIG. 1 is a representation of the undersurface of a member such as a top employed in a workstation or office desk, in which one or more cable supports according to the present invention is engaged.

As shown in FIG. 1, on the undersurface of the desk or workstation top 11 is formed a groove 12. One or more such grooves can be formed at the positions conveniently arranged for the cabling that is likely to be supported in that particular work station.

Co-operable with the groove 12 is a cable support 1 having a cable holding portion 2 preferably formed with hooks 3 and 4 extending from a shank 5 attached to a mounting portion 6. The mounting portion 6 has two opposed teeth 7 and 8. The mounting portion 6 of the cable support 1 is insertable into the groove and rotatable in the groove 12 about an axis of rotation aligned with the central longitudinal axis extending through the mounting portion 6 and the shank 5. The axis of rotation and the central longitudinal axis are identified by reference numeral 20 in FIG. 3.

Stops 9 are provided on opposite sides of the mounting portion 6 so that as the cable support 1 is rotated in a clockwise direction through 90° to engage in groove 12, the stop 9 prevents it rotating further than 90°.

A collar 10 is located below the mounting portion. The collar 10 acts in association with the mounting portion and the teeth 7 and 8 are preferably arranged at a slight incline of for example 5 degrees to the plane transverse to the longitudinal axis taken through the shank and mounting portion of the cable support.

It will be appreciated that the dimension of the mounting portion 6 transverse to the line extending between the two teeth 7 and 8 will be less than the distance between the side walls of the groove to allow easy insertion.

To install, the cable support is initially located in the groove with the two teeth 7 and 8 lined up or at least substantially aligned with the lengthwise direction of the groove and the collar 10 essentially abutting the undersurface of the top. The cable support may be rotated through a leverage which may be applied through the hooks 3 and 4 or by any other convenient means. The cable support is rotated through 90 degrees or substantially 90 degrees. The dimension of the groove relative to the mounting portion and teeth is such that the rotation causes the teeth 7 and 8 to penetrate into the side walls of the groove to lock or engage the cable support in position. In other words the length from the tip of one tooth to another is greater than the distance between the side walls of the groove 12 causing the teeth to penetrate the walls of the groove. The slight incline of the teeth 7 and 8 will tend to draw the cable support further into the groove assisting in the positive location. The stops 9 prevent further rotation of the cable support 1.

It will be appreciated from the foregoing that the cable support can be quickly and easily located at the most convenient position and the cabling supported in the hooks once the cable support is in position. It will be equally apparent that it is as simple to disengage the cable support for relocation in another position if for example the configuration of equipment on the workstation or desk top is changed or for any other reason.

What is claimed and desired to be secured by United States Letters Patent is:

1. A cable support for supporting a cable to an item of furniture, the cable support comprising:

a shank having between a first end and an opposing second end a mounting portion being formed at the first end of the shank;

a pair of spaced apart teeth each outwardly projecting from the mounting portion, each of the pair of teeth having a top surface and a bottom surface, the top surface and bottom surface each having a length extending from a forward end to an opposing tail end of each of the pair of teeth, at least a portion of both the top surface and the bottom surface of each of the pair of teeth being inclined along their length so as to slope downward in substantially the same direction toward the second end of the shank;

a cable holding portion disposed at the second end of the shank; and a collar at least partially encircling the shank and outwardly projecting therefrom, the collar being disposed between the pair of teeth and the cable holding portion.

2. A cable support as recited in claim 1, wherein the top surface and the bottom surface of each of the pair of teeth are inclined along their entire length so as to slope downward toward the second end of the shank.

3. A cable support as recited in claim 1, wherein the top surface and bottom surface of each of the pair of teeth extend from the mounting portion and intersect at an outside cutting edge.

4. A cable support as recited in claim 1, wherein at least a portion of both the top surface and the bottom surface of each of the pair of teeth are radially outwardly inclined so as to have a substantially V-shaped transverse cross section when viewed in a plane extending parallel through a central longitudinal axis of the shank.

5. A cable support as recited in claim 1, further comprising a stop outwardly projecting from the mounting portion between the pair of teeth.

6. A cable support as recited in claim 1, wherein the cable holding portion comprises one or more hooks.

7. A cable support as recited in claim 1, wherein the collar encircles the shank.

8. A cable support for supporting a cable to an item of furniture, the cable support comprising:

a shank having a first end and an opposing, second end, a mounting portion being formed at the first end of the shank;

a pair of spaced apart teeth each outwardly projecting from the mounting portion, each of the pair of teeth having a top surface and a bottom surface, the top surface and bottom surface each having a length extending from a forward end to an opposing tail end of each of the pair of teeth, at least a portion of both the top surface and the bottom surface of each of the pair of teeth being inclined along their length so as to slope downward toward the second end of the shank, at least a portion of both the top surface and the bottom surface of each of the pair of teeth also being radially outwardly inclined so as to have a substantially V-shaped transverse cross section;

at least one hook disposed at the second end of the shank; and a collar at least partially encircling the shank and outwardly projecting therefrom, the collar being disposed between the pair of teeth and the at least one hook.

9. A cable support as recited in claim 8, wherein the top surface and the bottom surface of each of the pair of teeth are inclined along their entire length so as to slope downward toward the second end of the shank.

10. A cable support as recited in claim 8, further comprising a stop outwardly projecting from the mounting portion between the pair of teeth.

11. A cable support as recited in claim 8, wherein the collar encircles the shank.

12. A method of supporting one or more cables from an item of furniture, the method comprising:

inserting a mounting portion of a cable support within a groove formed on the item of furniture, the groove being bounded by at least one side wall, the cable support having a tooth radially outwardly projecting from the mounting portion, the tooth having a top surface and an opposing bottom surface that intersect at an outside cutting edge, at least a portion of the cutting edge being inclined, the cable support also including a hook;

rotating the mounting portion of the cable support within the groove formed on the furniture such that the cutting edge of the tooth penetrates into the side wall of the furniture, the incline on the cutting edge producing a force that attempts to further advance the mounting portion into groove as the mounting portion is rotated; and resting a cable on the hook of the cable support.

13. A method as recited in claim 12, wherein the act of inserting includes a second tooth outwardly projecting from the mounting portion.

14. A method as recited in claim 12, wherein the act of rotating includes rotating the mounting portion of the cable support until a stop projecting from the mounting portion engages against the side wall bounding the groove.

15. A method as recited in claim 12, further comprising:

inserting the mounting portion into the groove until a collar of the cable support engages against the furniture; and rotating the mounting portion into the groove such that as the inclined cutting edge of the tooth penetrates into the side wall bounding the groove, the collar is biased under increased force against the furniture.

* * * * *

UNITED STATES PATENT AND TRADEMARK OFFICE
CERTIFICATE OF CORRECTION

PATENT NO. : 6,267,343 B1
DATED : July 31, 2001
INVENTOR(S) : Neville Waisbrod, Neil Herriot, John Wells, Jon Fifield and Robert Stewart It is certified that error appears in the above-identified patent and that said Letters Patent is hereby corrected as shown below:

Title page,
Item [75], Inventors, change "Harriot" to -- Herriot --
Item [56], FOREIGN PATENT DOCUMENTS, change "93 17 983 U" to
-- 93 17 983.9 U --
*Assistant Examiner*, change "Hooly N Sy" to -- Holly N. Sy --

Column 4,
Line 5, after "cabling", insert -- is --
Line 15, after "having", delete "between"
Line 16, after "second end", insert a comma Signed and Sealed this Twenty-fourth Day of September, 2002

*Attest:*

*Attesting Officer*

JAMES E. ROGAN
*Director of the United States Patent and Trademark Office*